(12) United States Patent
Weems et al.

(10) Patent No.: US 6,464,424 B1
(45) Date of Patent: Oct. 15, 2002

(54) REPAIRED SHROUD ASSEMBLY FOR BOILING WATER REACTOR

(75) Inventors: Sterling J. Weems, St. Petersburg, FL (US); William E. Sylvester, Vero Beach, FL (US)

(73) Assignee: MPR Associates, Inc., Alexandria, VA (US)

( * ) Notice: Subject to any disclaimer, the term of this patent is extended or adjusted under 35 U.S.C. 154(b) by 11 days.

(21) Appl. No.: 09/615,785

(22) Filed: Jul. 13, 2000

Related U.S. Application Data

(62) Division of application No. 09/225,778, filed on Jan. 5, 1999, now Pat. No. 6,138,353.
(60) Provisional application No. 60/070,496, filed on Jan. 5, 1998.

(51) Int. Cl.[7] ............................. F16B 2/14; F16B 7/04; B23P 15/00
(52) U.S. Cl. .................. 403/368; 29/402.15; 29/402.1; 29/403; 29/286; 29/374.1; 29/374.2; 29/374.3
(58) Field of Search ............................... 403/286, 374.1, 403/374.2, 374.3, 368; 29/402.1, 402.15

(56) References Cited

U.S. PATENT DOCUMENTS

| 146,207 A | | 1/1874 | Schneider | 403/293 |
|---|---|---|---|---|
| 497,915 A | * | 5/1893 | Fulghum | 403/294 |
| 624,770 A | | 5/1899 | Eibee | 24/25 X |
| 1,303,090 A | | 5/1919 | McCray | 30/308.3 |
| 1,540,570 A | | 6/1925 | Roberts | 249/205 |
| 2,008,087 A | | 7/1935 | Stromberg | 403/346 X |
| 3,168,941 A | * | 2/1965 | Southhard | 29/402.12 |
| 3,243,153 A | | 3/1966 | Kelly et al. | 248/231.21 |
| 3,469,865 A | * | 9/1969 | Ellenburg | 403/300 X |
| 3,995,685 A | | 12/1976 | Stanko | 403/381 X |
| 4,019,298 A | | 4/1977 | Johnson, IV | 403/381 X |
| 4,074,402 A | * | 2/1978 | Taketani | 24/268 |
| 4,300,271 A | | 11/1981 | Wohlhaupter | 403/381 X |
| 4,358,084 A | | 11/1982 | Bowman | 249/82 |
| 4,418,593 A | | 12/1983 | Frydel | 82/158 |
| 4,474,536 A | * | 10/1984 | Gougeon et al. | 403/294 X |
| 4,759,244 A | | 7/1988 | Engibarov | 82/154 |
| 4,941,758 A | | 7/1990 | Osawa | 384/40 |
| 5,392,322 A | | 2/1995 | Whitling et al. | 376/302 X |
| 5,402,570 A | | 4/1995 | Weems et al. | 376/302 X |
| 5,502,754 A | | 3/1996 | Erbes | 376/302 |
| 5,551,795 A | | 9/1996 | Engibarov | 403/381 |
| 5,577,082 A | | 11/1996 | Weems et al. | 376/302 |
| 5,600,689 A | | 2/1997 | Weems et al. | 376/302 |
| 5,600,690 A | | 2/1997 | Weems et al. | 376/302 |
| 5,623,526 A | | 4/1997 | Wivagg | 376/302 X |
| 5,664,793 A | | 9/1997 | Engibarov | 403/381 X |
| 5,675,619 A | | 10/1997 | Erbes et al. | 376/302 |
| 5,729,581 A | | 3/1998 | Loock et al. | 376/302 X |

(List continued on next page.)

*Primary Examiner*—Lynne H. Browne
*Assistant Examiner*—Ernesto Garcia

(57) ABSTRACT

A method of repairing a crack in a boiling water reactor shroud includes forming a pair of slots in the shroud on opposite sides of the crack in angled relation to one another so that the lateral spacing between the slots increases in a direction parallel to the crack, lowering a wedge clamp with laterally spaced slides into the annular space between the core shroud and the reactor vessel, positioning the slides in the slots, and moving the clamp in the direction of increasing lateral spacing between the slots to an operational position where the clamp prevents unacceptable opening of the crack during reactor operation by providing a structural load path which transmits structural loads across the crack. The slots are preferably configured to mate cooperatively in a manner which prevents the clamp from moving in a radially outward direction relative to the shroud once the clamp has been installed. The clamp can also be provided with locking members such as screws which extend from the clamp in a direction opposite the direction of increasing lateral slot spacing to hold the clamp in place by contacting walls of the slots.

3 Claims, 8 Drawing Sheets

U.S. PATENT DOCUMENTS

| | | | |
|---|---|---|---|
| 5,737,379 A | 4/1998 | Erbes | 376/302 |
| 5,781,603 A | 7/1998 | Wivagg | 29/402.01 X |
| 5,793,828 A | 8/1998 | Wivagg et al. | 29/402.14 X |
| 5,803,686 A | 9/1998 | Erbes et al. | 403/408.1 X |
| 5,905,771 A * | 5/1999 | Erbes et al. | 29/402.15 X |
| 5,995,574 A * | 11/1999 | Matsumoto et al. | 376/287 |
| 6,067,338 A * | 5/2000 | Erbes | 29/402.15 X |
| 6,138,353 A * | 10/2000 | Weems et al. | 29/890.031 |
| 6,174,102 B1 | 1/2001 | Do et al. | 403/381 |
| 6,178,635 B1 * | 1/2001 | McCurdy, Jr. et al. | 29/402.14 X |
| 6,182,491 B1 | 2/2001 | Perlman et al. | 403/381 X |
| 6,345,927 B1 * | 2/2002 | Pao et al. | 403/294 |

* cited by examiner

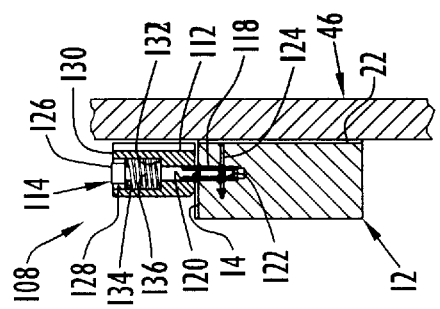
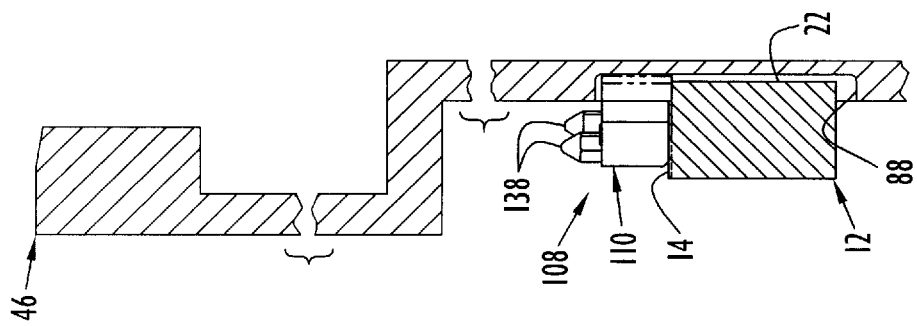
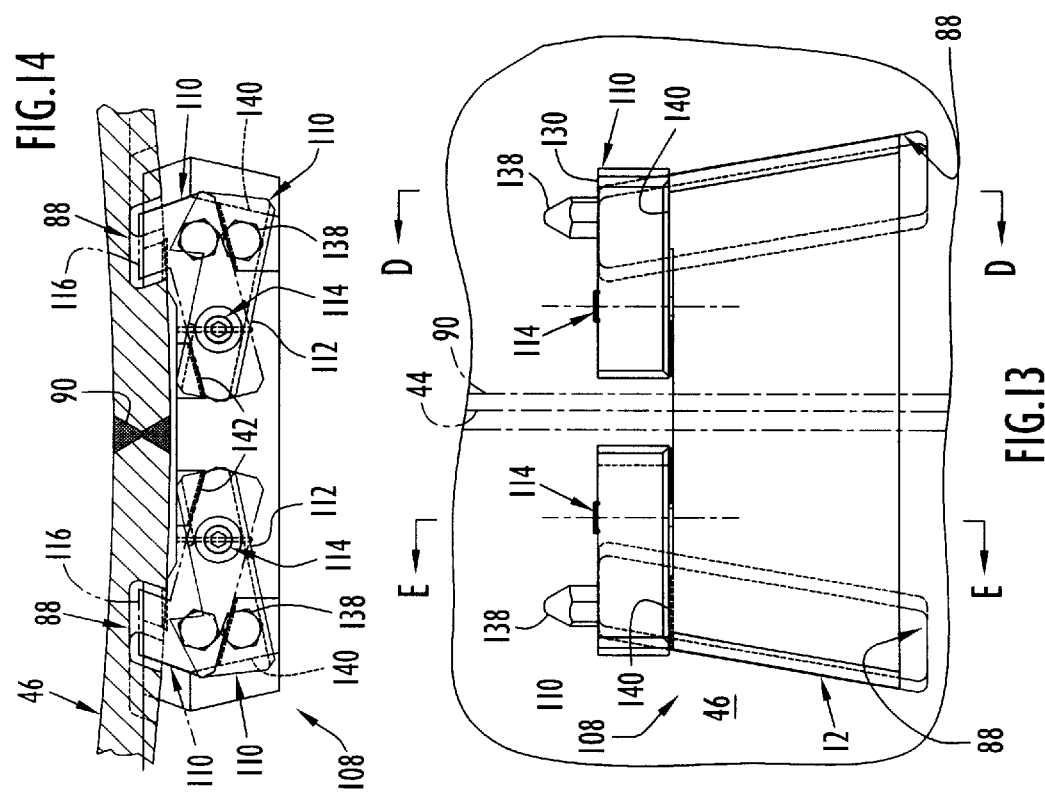

REPAIRED SHROUD ASSEMBLY FOR BOILING WATER REACTOR

CROSS-REFERENCE TO RELATED APPLICATIONS

This application is a divisional application of U.S. patent application Ser. No. 09/225,778 filed Jan. 5, 1999, now U.S. Pat. No. 6,138,353, the disclosure of which is incorporated herein by reference and which claims the benefit of U.S. Provision Patent Application Ser. No. 60/070,496 filed Jan. 5, 1998.

This application is a divisional application of U.S. patent application Ser. No. 09/225,778 filed Jan. 5, 1999, the disclosure of which is incorporated herein by reference.

BACKGROUND OF THE INVENTION

1. Field of the Invention

The present invention relates generally to boiling water reactors and, more particularly, to a method and apparatus for repairing welds in a boiling water reactor shroud.

2. Discussion Of The Related Art

Boiling water reactor shrouds are disposed concentrically within reactor vessels to divide the flow of coolant water through the reactor vessels and to structurally support and align the fuel assemblies, steam separator assemblies and control rod guide tubes. The shrouds are generally cylindrical and are typically formed of multiple arcuate steel plates joined by welds along their abutting vertical and horizontal edges. After periods of use, cracking of the shroud within heat affected zones of the welds tends to occur as a result of corrosion, radiation and stress. When excessive cracking of the welds occurs, the shroud must either be replaced or repaired.

U.S. Pat. No. 5,402,570 to Weems et al, the disclosure of which is incorporated herein by reference, describes a method of repairing boiling water reactor core shrouds having horizontal cracks in heat affected zones of welds by securing plural tie rods in vertical orientation about the periphery of the cracked shroud to axially compress the shroud and thereby urge the opposing surfaces of the horizontal cracks toward one another. Lateral or radial spacers or bumpers may also be installed between the inner surface of the reactor vessel and the outer surface of the shroud and/or tie rods to resist horizontal seismic loads and to hold the shroud in place relative to the vessel wall in the event of cracking along any horizontal weld during a seismic event.

While the tie rod repair described in U.S. Pat. No. 5,402,570 provides an acceptable method for mitigating the consequences of cracking along horizontal welds, there exists a need for a vertical weld repair which can be used alone or in combination with tie rods to mitigate the consequences of cracking along vertical welds in a boiling water reactor core shroud.

SUMMARY OF THE INVENTION

Accordingly, it is a primary object of the present invention to provide a method and apparatus for repairing cracked vertical welds in a boiling water reactor core shroud.

The repair according to the present invention involves forming a pair of slots in a core shroud on opposite sides of a crack in angled relation to one another so that the lateral spacing between the slots increases in a direction parallel to the crack, lowering a clamp with laterally spaced slides into the annular space between the core shroud and the reactor vessel, positioning the slides in the slots, and moving the clamp in the direction of increasing lateral spacing between the slots to prevent unacceptable opening of the crack during reactor operation by providing a structural load path which transmits structural loads across the crack. Preferably, the slides are toed laterally inward or toward one another and the slots extend into the shroud at oblique angles relative to the shroud surface to mate cooperatively with the inwardly toed slides to provide a locking feature which prevents the clamp from falling out of the slots. When repairing vertical welds in this manner, the slots are oriented so that the lateral spacing between the slots increases in the downward direction. The clamp can then be moved downwardly until it is tightly seated and will tend to remain tight due to gravity and flow loads which continue to exert downward forces on the clamp. The clamp can also be provided with locking members such as screws which extend from the clamp in a direction opposite the direction of increasing lateral slot spacing to hold the clamp in place by contacting walls of the slots.

Some of the advantages of the vertical weld repair according to the present invention are that the repair can be performed without unloading the reactor fuel, that the repair can be performed in combination with other types of repairs such as those involving installation of tie rods, that the repair can be designed to meet all operating and design basis loads for a reactor, that the repair eliminates the need to inspect the repaired weld thereby minimizing in-service inspection of the shroud, that the repair can mitigate the effects of cracking along welds without preloading, that the repair can accommodate cold feedwater injection, that the repair provides installation clearance take-up while holding opposed surfaces of a crack together for normal operation, that the repair can accommodate cracking well away from the weld as needed, that stresses on the shroud are minimized, that interference with reactor internals such as the top guide and core plate is minimized, that welds behind core spray piping and other structures in the reactor vessel can be repaired, that the repair will not loosen in service or create any shroud leak paths, and that the repair can be performed using no loose pieces in a cost effective and timely manner.

Other objects and advantages of the present invention will become apparent from the following description of the preferred embodiments taken in conjunction with the accompanying drawings, wherein like parts in each of the several figures are identified by the same reference numerals.

BRIEF DESCRIPTION OF THE DRAWINGS

FIG. 13 is a rear view of the weld repair clamp shown in FIG. 12 installed on a shroud.

FIG. 14 is a top view, partly in section, of the weld repair clamp shown in FIG. 12 installed on a shroud.

FIG. 15 is a sectional side view taken through line D—D in FIG. 13.

FIG. 16 is a sectional side view taken through line E—E in FIG. 13.

DETAILED DESCRIPTION OF THE PREFERRED EMBODIMENTS

Figure 1:
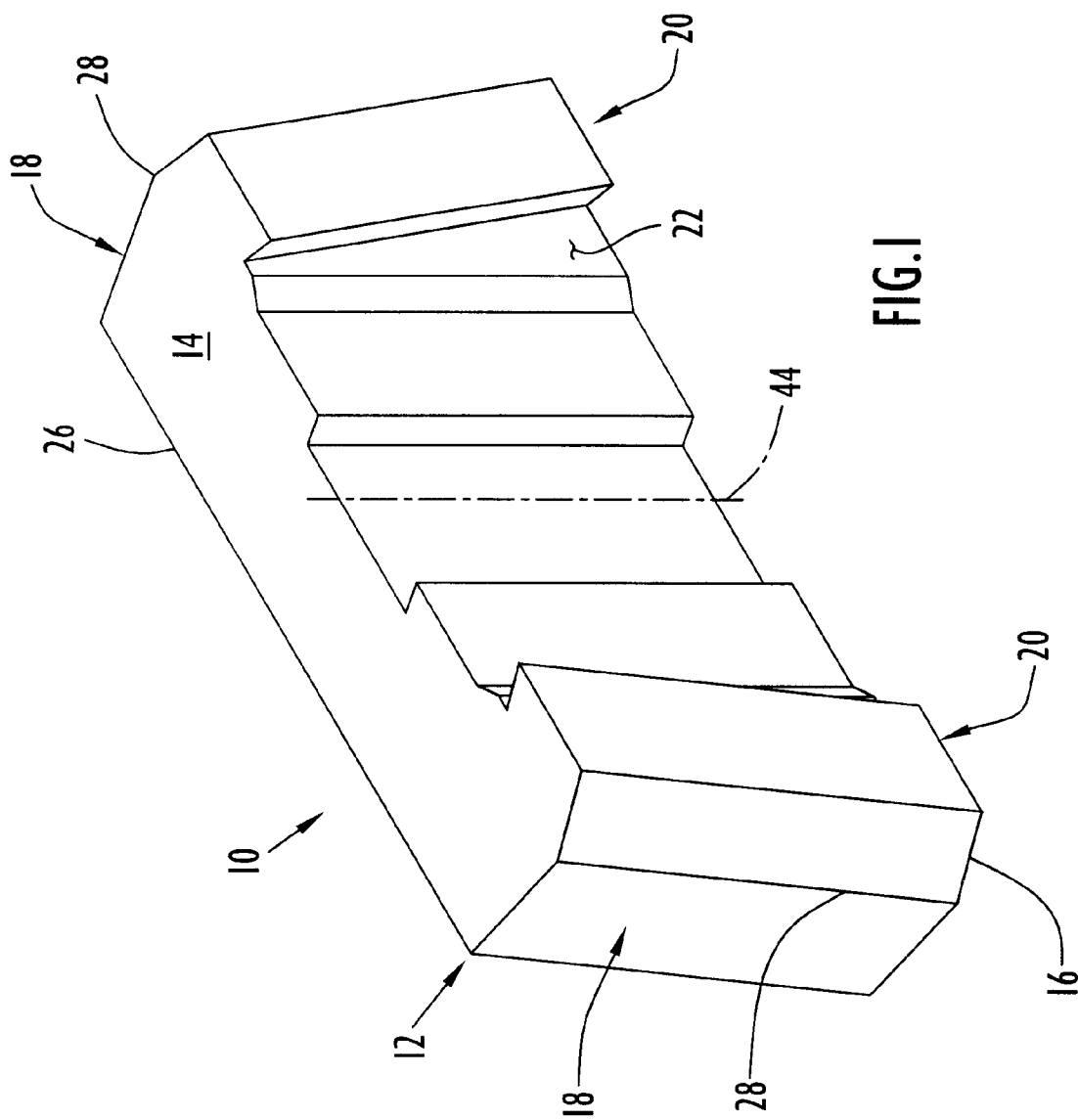
FIG. 1 is a front perspective view of a weld repair apparatus or clamp according to the present invention.
Figure 2:
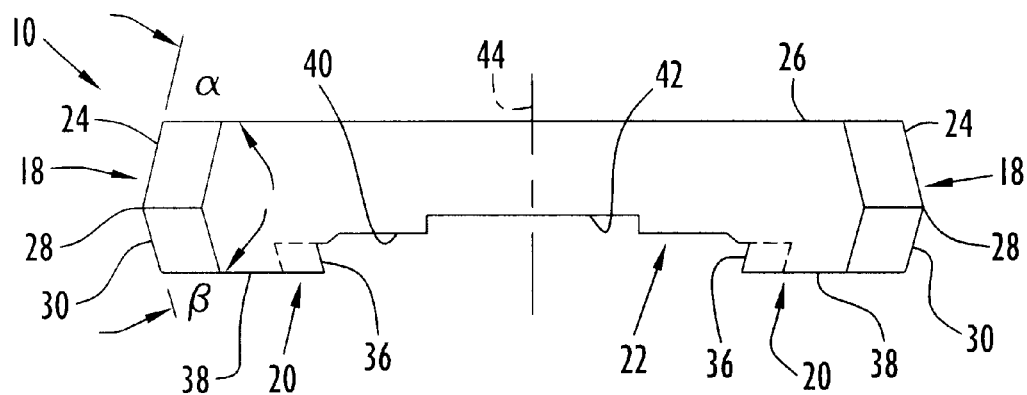
FIG. 2 is a top plan view of the weld repair clamp shown in FIG. 1.
Figure 3:
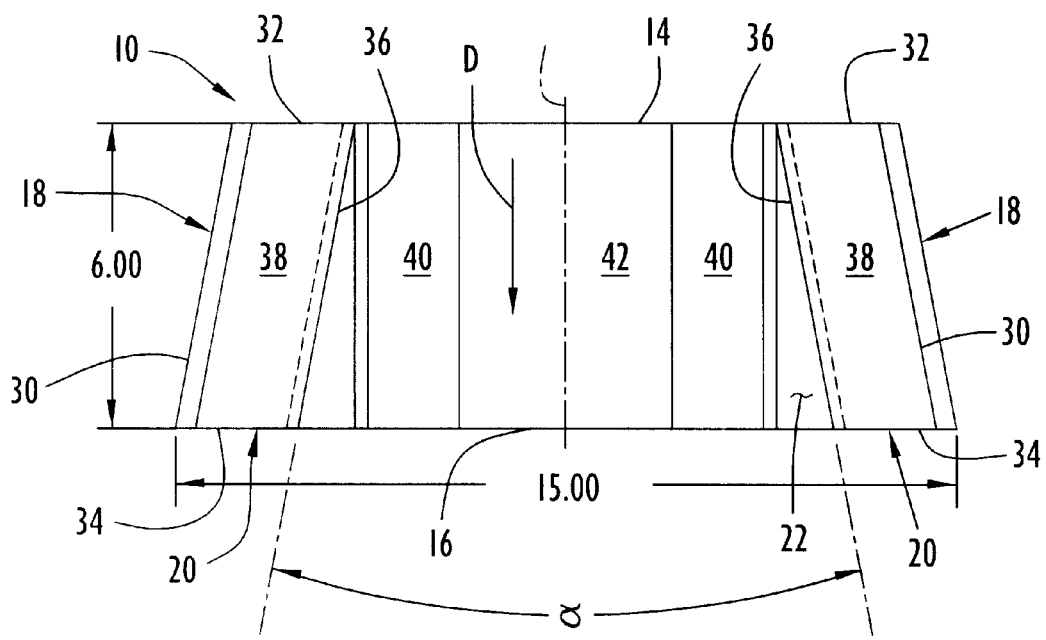
FIG. 3 is a front elevational view of the weld repair clamp shown in FIG. 1.

A weld repair apparatus or clamp 10 according to the present invention, as illustrated in FIGS. 1–3, includes a main body portion or base 12 of generally trapezoidal configuration having parallel top and bottom surfaces 14 and 16 connected by tapered lateral surfaces or sides 18, and a pair of slide members or slides 20 mounted or formed along the tapered sides to protrude from a front surface or face 22 of the base. The top surface 14 of the base 12 is shorter than the bottom surface 16 of the base so that the sides 18 of the base taper or flare outwardly in the downward direction looking at FIG. 3. As best seen in FIG. 2, each lateral surface or side is preferably composed of a first planar surface 24 extending forwardly at an angle from a flat back surface or face 26 of the base in a laterally outward direction to a crest or junction 28 connecting the first planar side surface with a second planar side surface 30 extending forwardly at an angle β from the crest in a laterally inward direction to define an outer surface of the slide on the front surface or face of the base.

Each of the slides 20 is an elongate bar or beam of parallelepiped configuration with top and bottom surfaces 32 and 34 flush with top and bottom surfaces 14 and 16 of the base, respectively, an outer surface defined by the second planar surface 30 on the side of the base, and an inner surface 36 parallel with the outer surface and extending rearwardly at an acute angle from a front surface 38 of the slide in a laterally outward direction to the front surface 22 of the base, giving the slides a "toed-in" appearance when viewed from above as shown in FIG. 2. The slides 20 are also oriented at an angle γ relative to one another so that the lateral spacing between the slides, i.e. the lateral spacing between inner surfaces 36, increases in a direction D of increasing lateral spacing, the direction of increasing lateral spacing for clamp 10 being the downward direction looking at FIG. 3. The front surface or face 22 of the base includes a generally concave portion between the slides defined by a series of recessed planar surfaces or steps 40 and 42 of increasing depth in the direction of the central longitudinal axis 44 of the base, the concave portion having a configuration to fit against the outer surface of a cylindrical core shroud with some clearance when the slides are disposed within slots formed in the shroud as described below.

Figures 4, 5:
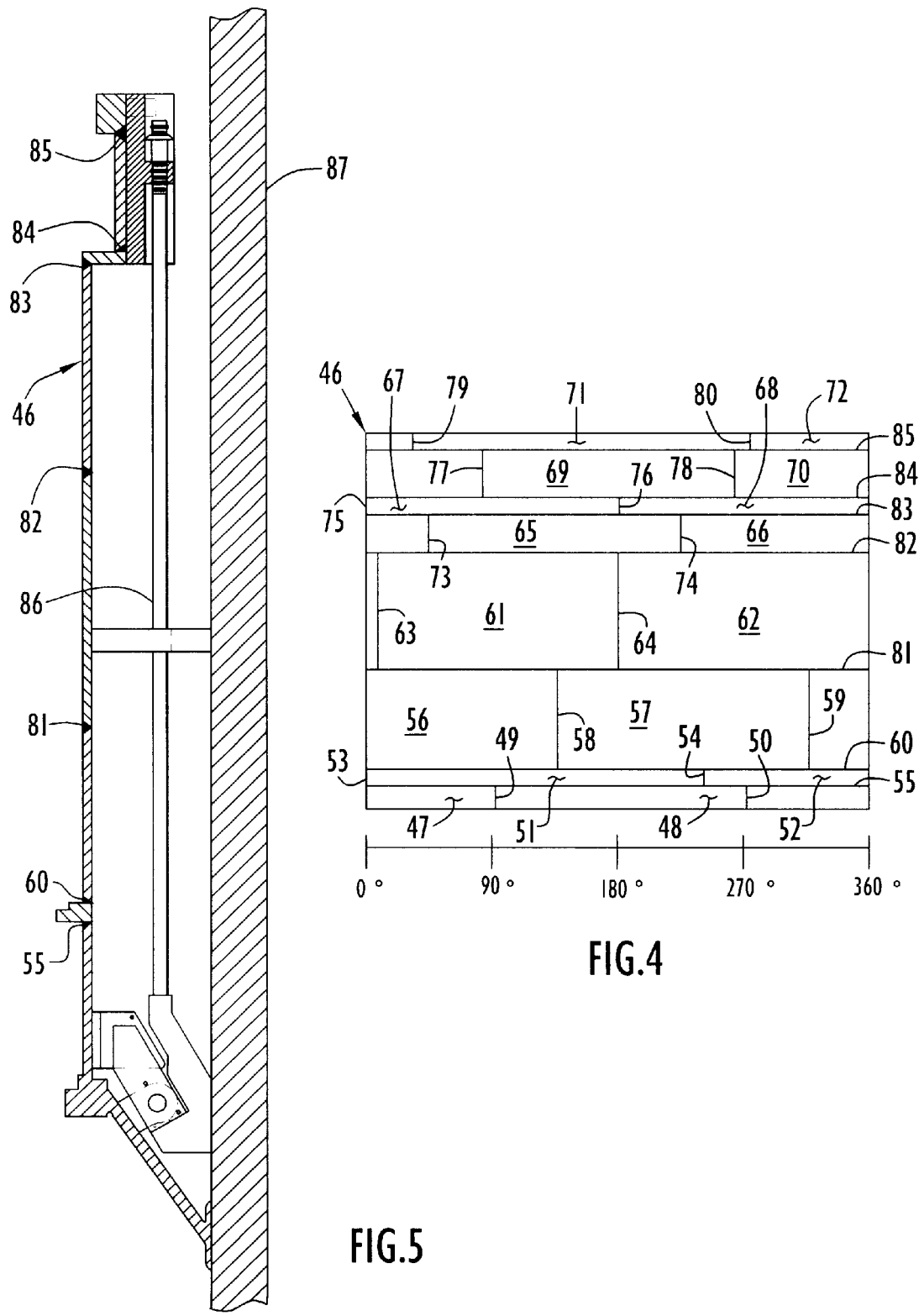
FIG. 4 is a flattened projection of a cylindrical core shroud for a boiling water reactor.
FIG. 5 is a side view, partly in section, of a core shroud repaired with tie rods.

In order to provide a point of reference for understanding the repair method according to the present invention, a core shroud 46 for a boiling water reactor is shown in FIG. 4 in flattened projection adjacent a 360° scale provided for angular orientation reference. The plates in FIG. 4 are oriented with their long or arcuate dimensions disposed horizontally, their width dimensions disposed vertically and their thickness dimensions disposed radially or into the plane of the drawing in FIG. 4.

The particular core shroud illustrated in FIG. 4 includes eight horizontal annular levels of plates, the plates at any level being of the same width (or height) with the height varying from level to level. As illustrated, the bottom annular level is made up of two plates 47 and 48, each about 180° in circumferential length and about 22.13 inches in height, disposed end to end and welded together at abutting ends to form vertical welds 49 and 50. The second level from the bottom is made up of two plates 51 and 52, each 180° in circumferential length and about 4.5 inches in height, welded together at abutting ends to form vertical welds 53 and 54. The bottom edges of plates 51 and 52 are welded to the abutting top edges of plates 47 and 48 to provide a circumferentially continuous horizontal weld 55. The vertical welds 53 and 54 between plates 51 and 52 are angularly offset from vertical welds 49 and 50 so that vertical welds in adjacent levels are not in angular or longitudinal alignment.

The third level from the bottom is made up of two 180° plates 56 and 57, of greater height than the first two levels (e.g., 63.50 inches), welded together at abutting ends to form vertical welds 58 and 59 angularly offset from vertical welds between plates in the second level. Bottom edges of plates 56 and 57 are welded to the abutting top edges of plates 51 and 52 to provide a circumferentially continuous horizontal weld 60. The fourth annular level of shroud plates includes two 180° plates 61 and 62 having abutting ends welded together to form vertical welds 63 and 64 angularly offset from vertical welds in plates 56 and 57 in the third level, the plates of the fourth level being of greater height (e.g., 90.12 inches) than any of the plates making up the other levels. In like manner, successively higher annular levels of the shroud includes two 180° plates 65 and 66 of about 18.50 inches height at level five, two 180° plates 67 and 68 of about 2.0 inches height at level six, two 180° plates 69 and 70 of about 31.25 inches height at level seven, and two 180° plates 71 and 72 of about 6.0 inches height at level eight. Level five has vertical welds 73 and 74; level six has vertical welds 75 and 76; level seven has vertical welds 77 and 78; and level eight has vertical welds 79 and 80. Circumferentially continuous horizontal welds 81, 82, 83, 84 and 85 are provided between levels three and four, levels four and five, levels five and six, levels six and seven, and levels seven and eight, respectively.

Since the horizontal welds are circumferentially continuous, a crack in the heat affected zone of one of the horizontal welds could ultimately extend about the entire circumference of the shroud resulting in significant relative horizontal movement between shroud levels in response to seismic events and other vibrations. As illustrated in FIG. 5, horizontal cracks in a core shroud 46 can be repaired by securing plural tie rods 86 to the shroud in vertical orientation within the annular space between the reactor vessel 87 and the shroud to axially compress the shroud and thereby urge the opposing surfaces of the horizontal cracks toward one another. Since no vertical welds in any shroud level are aligned with vertical welds in an adjacent shroud level, a crack in a heat affected zone of any vertical weld cannot extend beyond one shroud level. Nevertheless, shroud separation at a cracked vertical weld can adversely affect coolant flow through the reactor and must therefore be dealt with to ensure safe reactor operation.

The repair method according to the present invention can be performed upon the first indication of cracking in the heat affected zones of vertical welds, for example during or after a periodic inspection of the shroud. The repair method involves installing a weld repair clamp on the shroud in situ, either alone or in combination with tie rods in the case of horizontal cracking, while the reactor is shut down.

Figure 6:
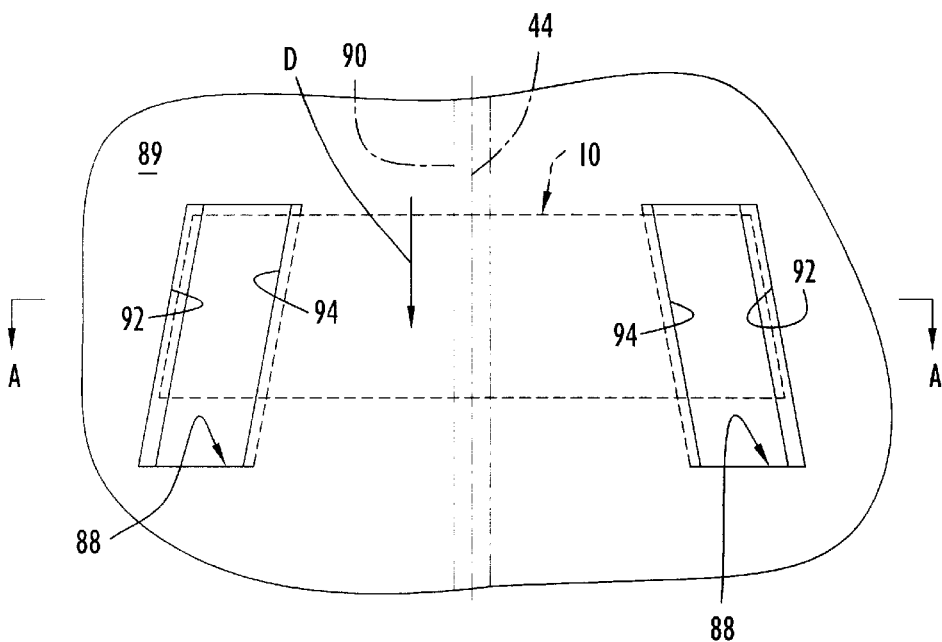
FIG. 6 is a fragmentary plan view of a vertical weld in a core shroud illustrating a pair of slots formed according to the present invention.
Figure 7:
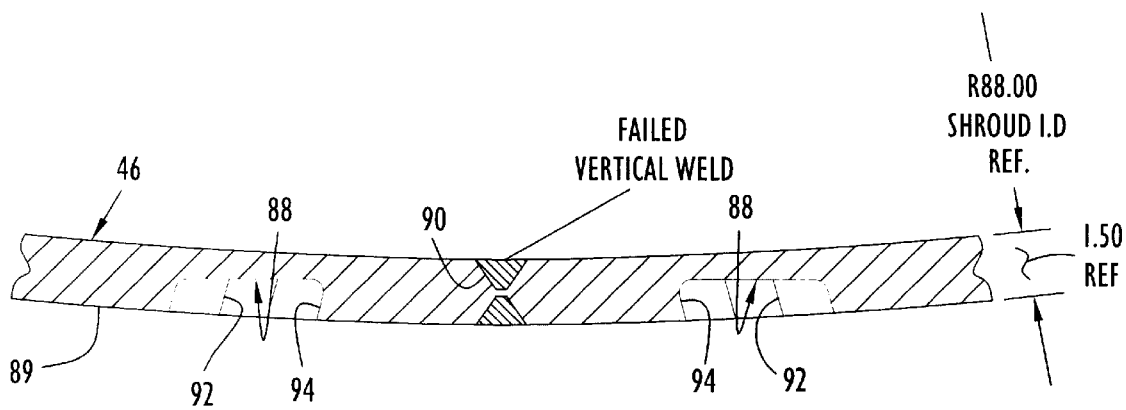
FIG. 7 is a fragmentary sectional view, taken through line A—A in FIG. 6, of a vertical weld with slots formed on each side in accordance with the present invention.
Figure 8:
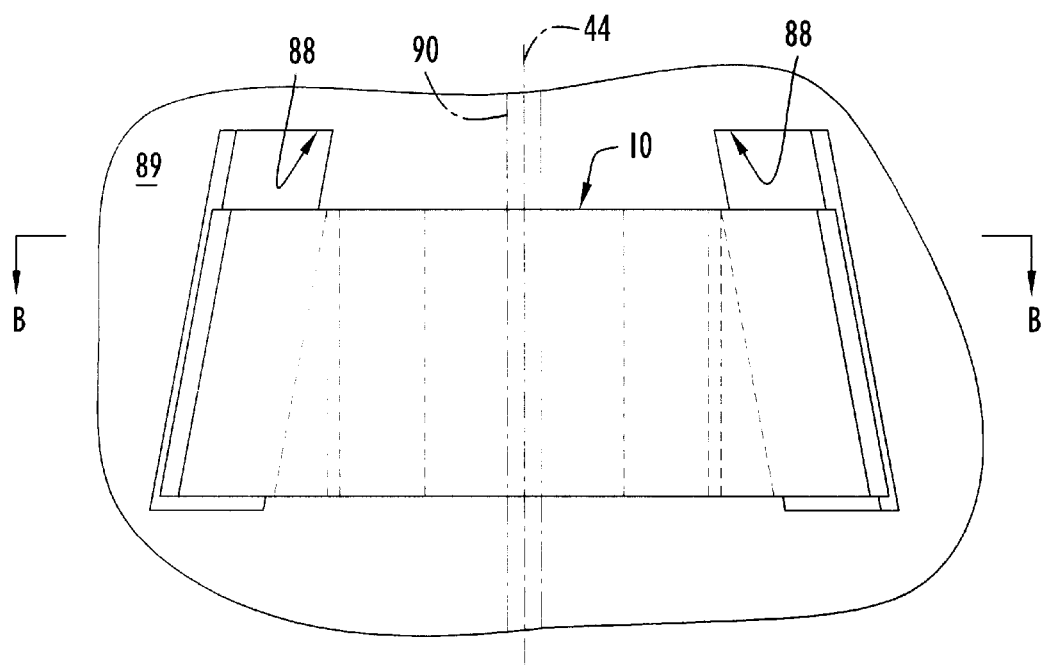
FIG. 8 is a fragmentary plan view of a vertical weld in a core shroud repaired using a clamp according to the present invention.
Figure 9:
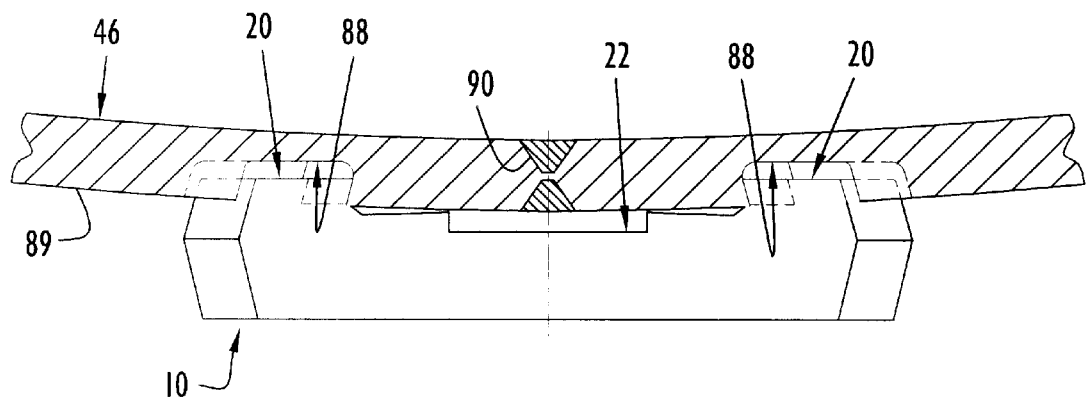
FIG. 9 is a fragmentary sectional view, taken through line B—B in FIG. 8, illustrating a vertical weld repaired using a clamp according to the present invention.

Specifically, installation of a weld repair or wedge clamp 10 according to the present invention, as illustrated in FIGS. 6–9, involves forming a pair of angled slots or grooves 88 in an exterior surface 89 of a core shroud 46 on opposite sides of a crack, represented for example by line 91, in a vertical weld 90 (e.g., using electrical discharge machining or EDM techniques), lowering the clamp into the annular space between the core shroud and the reactor vessel, inserting the slides 20 on the front of the clamp into the slots on the shroud, and urging the clamp to move downwardly in the slots until the clamp is tightly seated. The slots 88 are angled relative to one another and the weld 90 such that the lateral spacing between the slots increases in the direction D of increasing lateral spacing, i.e. the downward direction looking at FIG. 6. The lateral spacing between upper ends of the slots 88 as well as the angular orientation and width of the slots are approximately the same as that of the clamp slides 20; however, the slots are somewhat longer than the slides (e.g., about 3.0 inches longer) so that the lateral spacing between lower ends of the slots is initially greater than that of the lower ends of the clamp slides. As best seen in FIG. 7, opposed longitudinal walls 92 and 94 of each slot are angled or toed laterally inward, in the direction of the weld, to match the toed-in configuration of the slides; however, the width and spacing of the slots is such that the slides will fit into upper portions of the slots with little difficulty. As best seen in FIG. 6, the inner walls 94 are spaced laterally from the crack 91, and the outer walls 92 are spaced further laterally from the crack than the inner walls, respectively. The radial depth of the slots will depend upon the amount of force needed to prevent the crack from opening during reactor operation, the shape and size of the slides and the slide material but is preferably about half the thickness of the shroud (e.g., about 0.75 inch).

The clamp 10 is preferably lowered into the annular space between the core shroud 46 and the reactor vessel 87 with the slides 20 facing the shroud to avoid having to reposition the clamp in the annular space. The slides 20 are then aligned with respective upper portions of the slots 88 and are inserted into the slots by moving the clamp radially inward in the direction of the shroud 46. Despite the curvature of the core shroud 46, the front surface or face 22 of the clamp will not prevent full insertion of the slides into the slots since the front face defines a concave surface providing clearance between the clamp and the shroud. With the slides 20 positioned in the upper portion of the slots 88 as shown by broken lines in FIG. 6, a downward force is applied to the clamp parallel to weld 90 and longitudinal axis 44 of the clamp to force the slide members to slide downwardly within the slots to a fully tightened position as shown by solid lines in FIGS. 8 and 9. As the clamp 10 moves downwardly, the clearance between the inwardly canted or toed surfaces 30 and 36 of the slides 20 and the correspondingly canted or toed wall surfaces 92 and 94 defining slots 88 decreases such that the surfaces mate in an interlocking manner to prevent the clamp from sliding out of the slots. More specifically, it can be seen that the innermost canted walls of the slots extend across the inserted portions of the slides in an overlapping or laterally juxtaposed manner to prevent radially outward movement of the clamp relative to the shroud. Since the slots 88 are angled away from one another in the downward direction, movement of the clamp 10 downwardly also causes the angled inner surfaces 36 of the slide members 20 to apply forces to the inner walls 94 of the slots 88 having components transverse to the direction of movement of the clamp and the orientation of the crack. Since the clamp 10 is tightened during installation, all installation clearances and manufacturing tolerances are automatically taken up with no loose parts and, once installed, the weld repair clamp 10 will prevent unacceptable opening of the cracked vertical weld 90 in response to pressure loads inside the shroud during reactor operation by providing a structural load path to transmit all structural loads across the cracked weld. If sufficient downward force is applied during installation, the weld repair clamp will also cause the slots 88 to move toward one another thereby circumferentially compressing the shroud in the vicinity of the cracked weld 90 to urge opposed surfaces of the crack toward one another.

The weight of the clamp should be sufficient to maintain the position of the clamp in the slots, particularly when combined with frictional forces and fluid flow forces resulting from downward movement of the feedwater within the annulus in which the clamp is disposed. Moreover, the clamp will tend to retighten itself, due to gravity and flow loads, should it ever become loosened due to local yielding or radiation growth. Tightness of the clamp can further be ensured by pushing down on the clamp during an outage, if desired.

Figure 10:
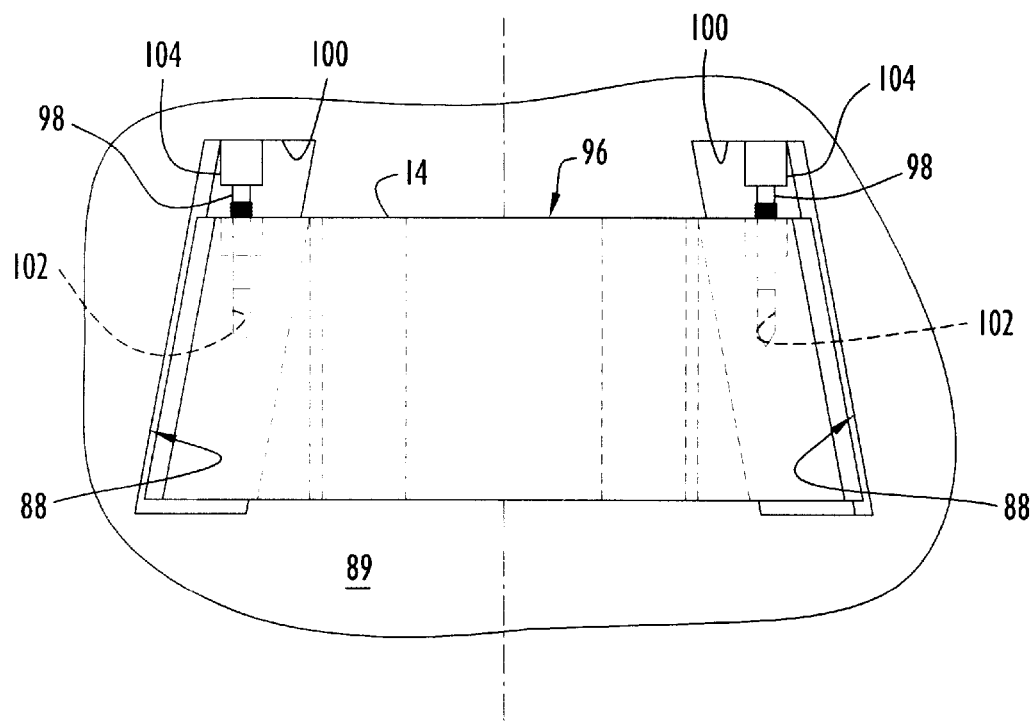
FIG. 10 is fragmentary plan view of a vertical weld in a core shroud repaired using a modification of a weld repair clamp according to the present invention.
Figure 11:
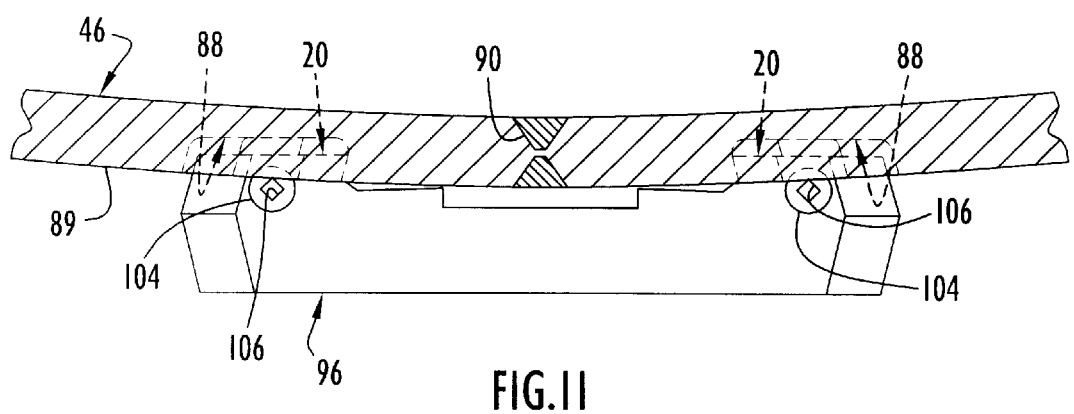
FIG. 11 is a fragmentary sectional view, taken through line C—C in FIG. 10, illustrating a vertical weld repaired using the modified weld repair clamp.
Figure 12:
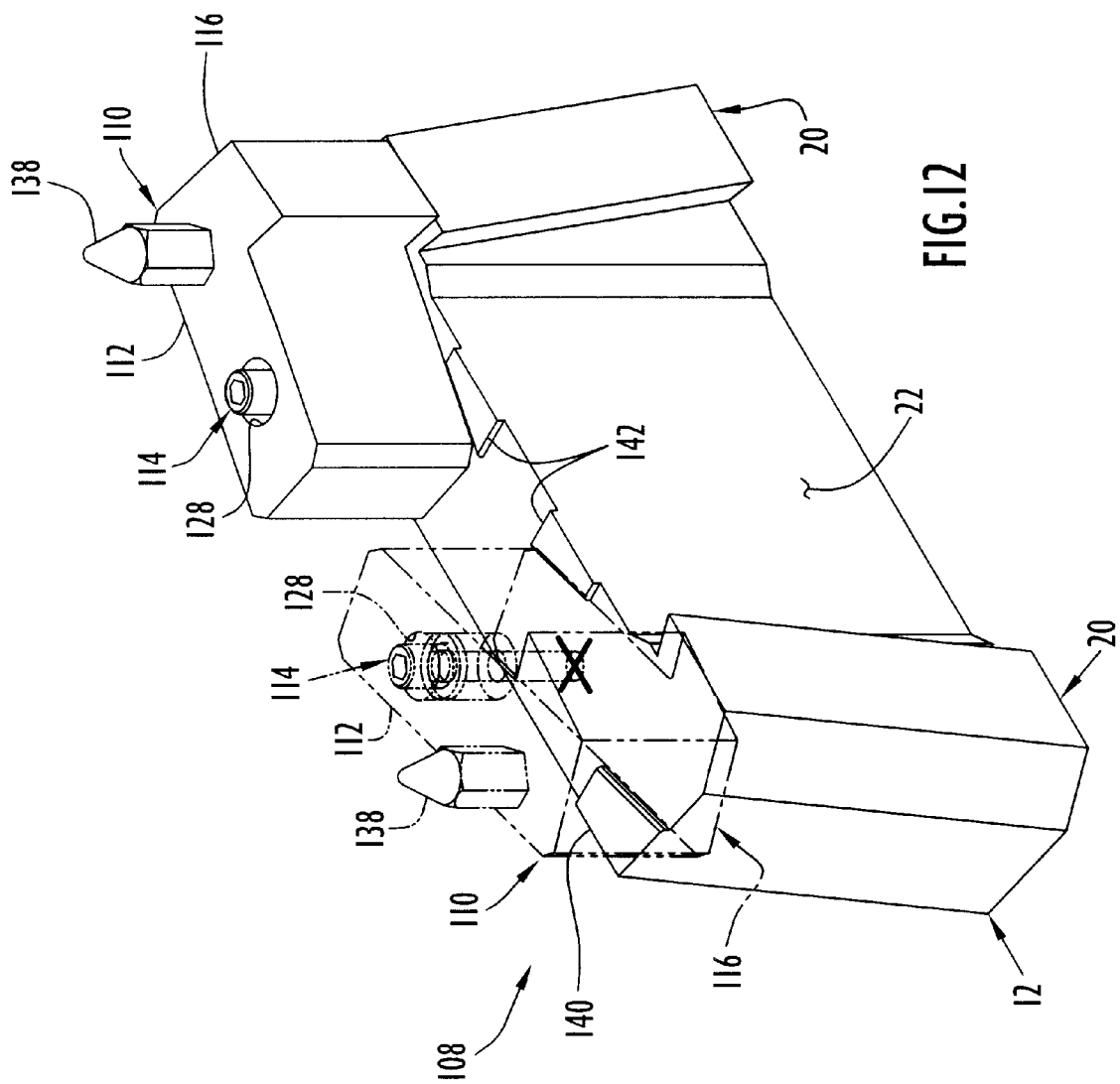
FIG. 12 is a front perspective view of another modification of a weld repair clamp according to the present invention.

Other techniques can be used to prevent the clamp from backing out of the slots or loosening under load. For example, in FIGS. 10 and 11, a modification of a weld repair clamp according to the present invention is shown wherein the modified clamp 96 is similar to the clamp described above but with a pair of screws 98 extending upwardly from the clamp to bear against the upper wall 100 of each slot. Screws 98 are received in threaded openings or holes 102 formed in the top surface 14 of the clamp, the threaded holes being counterbored so that, prior to installation, the screws can be inserted into the holes with their caps or heads 104 recessed and, once installed, the screws can be backed out of their holes to assist in positioning and/or holding the clamp in place. The holes 102 are located so as to position a portion of each screw head 104 to bear against a wall of the slot, the position of the screw head also being such that a driver can engage a slot, socket or other mating feature 106 of the screw head to permit the screw to be turned.

FIGS. 12–16 illustrate another modification of a weld repair clamp according to the present invention wherein the modified weld repair clamp 108 includes a pair of locking members 110 movable between an open, unlocked or retracted position allowing the clamp to slide along slots formed in a core shroud and a closed, locked or extended position preventing the clamp from backing out of the slots or loosening under load. Each locking member 110 is shown as a generally L-shaped plate or member having a first arm 112 pivotably mounted on a screw 114 extending upwardly from the top surface 14 of the clamp and a second arm 116 extending forwardly at an angle from the first arm in the direction of the shroud, the second arm having a configuration to fit within the upper portion of a slot in the shroud when the main body 12 of the clamp has been installed in the lower portion of the slot and the locking member has been moved to the closed or locked position shown by broken lines in FIG. 14. Screw 114 includes a threaded shank 118 which extends downwardly through a hole 120 in the first arm 112 of the locking member 110 to be received within a threaded opening or hole 122 in the top surface 14 of the main body of the clamp. A pin 124 extends rearwardly from the front face 22 of the clamp and through screw shank 118 to prevent loosening of the screw 1 14 after assembly. A cap or head 126 at the top of screw 114 is received within a cylindrical recess 128 extending downwardly from a top surface 130 of locking member 110 to a radial step or shoulder 132 connecting the recess with hole 120. A spring guide or washer 134 having a diameter substantially the same as the diameter of recess 128 is carried on screw shank 118 adjacent screw head 126, and a spring 136 is disposed within cylindrical recess 128 and held in compression between washer 134 and shoulder 132 at the bottom of the recess to bias the locking member downwardly relative to the main body of the clamp while permitting the locking member to be lifted upwardly against the bias of the spring. A lug 138 having a plurality of vertical surfaces arranged in a hexagonal configuration extends upwardly from the locking member adjacent the junction between the first and second arms to couple with tooling used to rotate the locking member about the pivot axis defined by the screw.

The main body 12 of the modified weld repair clamp 108 is similar to those described above but with pads, stops or elevated abutments 140 and 142 formed on the top surface of the clamp in spaced relation to receive the first arm 112 of locking member 110 therebetween in the locked or closed position.

In use, weld repair clamp 108 will typically be lowered into the annular space between the core shroud and the reactor vessel with locking members 110 in the open or unlocked positions shown by solid lines in FIG. 14. In the open or unlocked position, each locking member 110 is rotated away from the shroud 46 and made to rest upon pads 140 and 142 such that the locking member is vertically spaced above the top surface of the clamp. With the locking members retracted, clamp 108 can be installed in the same manner described above; however, once the clamp is installed, locking members 1 10 can be rotated from the open, unlocked or retracted positions shown by solid lines in FIG. 14 to the closed, locked or extended positions shown by broken lines in the same figure such that the second arm 116 of each locking member will fit within the slot 88 between the main body 12 of the clamp and the top 100 of the slot to prevent upward movement of the clamp within the slots. Rotation of the locking members can be accomplished by inserting a long handle tool into the annulus between the reactor vessel and the core shroud and coupling the tool with the lugs 138 on the top surface of the locking members so that appropriate forces may be exerted on the locking members to cause rotation thereof about the pivot axes defined by screws 114. As the locking members are rotated, each locking member will slide off of pads 140 and 142 and be drawn downwardly between the pads under the bias of spring 136. Pads 140 and 142 are spaced to receive the first arm of the locking member therebetween in the locked or closed position thereby preventing pivotal movement or rotation of the locking member out of the locked position until such time as the locking member is intentionally lifted.

While the weld repair clamp according to the present invention has been shown and described as being used to repair cracks along vertical welds of a core shroud, it will be appreciated that the clamp can also be used to repair cracks along horizontal welds simply by forming slots on opposite sides of a horizontal weld and orienting the clamp so that the slides fit in the slots. When repairing vertical welds, the spacing between the slots preferably increases in the downward direction so that installation of the wedge clamp is assisted by gravity. It will be appreciated, however, that the slots can be arranged such that the spacing therebetween increases in the upward direction or in any other direction relative to the crack, particularly when locking members are used to hold the clamp in an operational position along the length of the slots. While locking members such as screws and pivoting members are shown, it will be appreciated that other types of locking members can be used including, but not limited to, sliding, spring-biased or ratcheting locking members which can be positioned between the clamp and walls of the slots or other reactor components to hold the clamp in place. Because of the relatively large span of the clamp (i.e., the space between slots), the clamp can also be used to repair cracks in the shroud adjacent the welds as well as cracks in other parts of the shroud remote from any welds.

The slides can be bars or beams of parallelepiped configuration as shown, can be solid or hollow, or have any other suitable configuration. For example, each slide could be formed by one or more cylindrical protrusions, posts or pegs. The slides can be formed with the base as an integral one-piece unit or can be formed separately of the base and attached thereto by any suitable method such as, for example, welding or bolted attachment. The base can be trapezoidal as shown or have any other suitable shape including, but not limited to, circular, rectangular and other elliptical and polygonal configurations. If desired, the base can extend laterally and/or longitudinally beyond the slides to form a rim or be of smaller dimension and connect only a portion of the slides. The base can have various cut-outs, recesses, bevels, chamfers, and through-holes therein to provide clearance for existing structure in the reactor.

While the slots and slides are shown toed-in or oriented at oblique angles relative to the surface of the shroud so as to mate cooperatively in a manner preventing the clamp from falling out of the slots, it will be appreciated that any configuration wherein the slides are captured within the slots and restrained from moving radially outward relative to the shroud can be used. For example, the slots can be of increasing width in the inboard direction (i.e., toward the center of the shroud) with the slides including bulging or bent portions which are captured within the slot and thus radially restrained relative to the shroud.

The clamp is preferably formed of Type 304, 316 or 347 stainless steel which has been solution annealed and rapid quenched; however, any suitable material can be used including, but not limited to, higher strength materials such as annealed XM-19. When springs are used to bias locking members of the clamp, the springs can be made of any suitable material such as, for example, precipitation hardenable nickel alloy X-750 (UNS N07750) in accordance with EPRI document NP-7032. In an exemplary embodiment, for example to repair vertical welds 63 and 64 in the shroud shown in FIG. 4, the thickness of the clamp (not including slides) is preferably about 3.0 inches, with the height of the clamp being about 6.00 inches, the length of the bottom surface of the clamp being about 15.00 inches and the length of the top surface of the clamp being about 12.00 inches. In one embodiment, the first planar side surface 24 is oriented at an angle of about 77° relative to the back surface, the second planar side surface 30 is oriented at an angle $\beta$ of about 70° relative to the front surface, and the angle γ between the slides and the slots is about 20°. The dimensions of the clamp can be varied dependent upon the shroud being repaired, the location of the weld repair and the material of the clamp. For example, when repairing welds 77 and 78 in the shroud shown in FIG. 4, it may be desirable to utilize a thinner clamp so that the clamp can be installed between the shroud and core spray piping spaced about two inches from the shroud. In an exemplary embodiment, the slots have a width of about 2.0 inches a length of about 8.0 inches and a depth of about 0.75 inch. Lateral spacing between the slots will vary along the length of the weld, for example from about 10 inches to about 13 inches center-to-center so that, as the clamp is moved along the slots, the clamp will draw the slots together thereby decreasing the slot spacing as it is moved.

While a single clamp is shown for repairing a weld, it will be appreciated that plural clamps can be installed along a single weld and/or distributed among many welds depending upon the condition of the shroud. In the event of significant cracking of both vertical and horizontal welds in a core shroud, the clamps can be used in combination with tie rods which axially compress the shroud to ensure sufficient shear load transfer at the horizontal welds. While a specific tie rod is shown in FIG. 5 for purposes of illustration, it will be appreciated that the weld repair clamp according to the present invention can be used in combination with any type of tie rod including, but not limited to, any of the tie rods shown and described in U.S. Pat. Nos. 5,402,570, 5,577,083, and 5,600,689, the disclosures of which are incorporated herein by reference.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A repaired shroud assembly for a boiling water reactor, comprising a cylindrical core shroud with a crack and a pair of slots on opposite sides of said crack, each of said slots defining an inner wall spaced from said crack and an outer wall, opposite said inner wall, spaced further from said crack, said slots being in angled relation to one another so that a lateral spacing between said inner walls increases in a direction of increasing lateral spacing parallel to said crack; and a wedge clamp comprising a pair of interconnected, spaced slides inserted in said slots, respectively, each of said slides having an inner surface and an outer surface, said slides being in angled relation to one another and having a lateral spacing between said inner surfaces increasing in said direction of increasing lateral spacing, said wedge clamp being movable in said direction of increasing lateral spacing to limit separation at said crack.

2. The repaired shroud assembly for a boiling water reactor as recited in claim 1 wherein said inner walls extend across said slides, respectively, in juxtaposed relation to prevent radially outward movement of said clamp relative to said shroud.

3. The repaired shroud assembly for a boiling water reactor as recited in claim 1 and further comprising at least one locking member extending from said clamp in a direction opposite said direction of increasing lateral spacing to hold said clamp in place by contacting a wall portion of said slots.

* * * * *